United States Patent [19]
Guichard et al.

[11] Patent Number: 4,458,135
[45] Date of Patent: Jul. 3, 1984

[54] COMPACT TOOL FOR AUTOMATIC MAG SPOT WELDING

[75] Inventors: Michel Guichard, Viroflay; Alain Jouoire, Douai, both of France

[73] Assignee: Regie Nationale des Usines Renault, Boulogne-Billancourt, France

[21] Appl. No.: 361,243

[22] Filed: Mar. 24, 1982

[30] Foreign Application Priority Data

Apr. 8, 1981 [FR] France ................. 81 07080

[51] Int. Cl.³ ............................................. B23K 9/12
[52] U.S. Cl. ............................. 219/127; 219/137.31; 242/57; 242/75.45
[58] Field of Search ............... 219/137.2, 137.31, 127, 219/74; 242/75.45, 57

[56] References Cited

U.S. PATENT DOCUMENTS

| 1,353,401 | 9/1920 | James | 242/75.45 |
| 3,022,414 | 2/1962 | Yoder | 219/127 |
| 3,210,523 | 10/1965 | Cotter et al. | 219/137.31 |
| 3,469,069 | 9/1969 | Allen | 219/127 |
| 3,709,604 | 1/1973 | Niesen et al. | 242/57 |
| 4,224,502 | 9/1980 | Weaver et al. | 219/137.2 |

FOREIGN PATENT DOCUMENTS

| 687427 | 1/1940 | Fed. Rep. of Germany . |
| 1402195 | 6/1965 | France . |
| 1460997 | 12/1966 | France . |
| 839661 | 6/1960 | United Kingdom . |

Primary Examiner—B. A. Reynolds
Assistant Examiner—Alfred S. Keve
Attorney, Agent, or Firm—Oblon, Fisher, Spivak, McClelland & Maier

[57] ABSTRACT

In a compact tool for automatic MAG spot welding, all of the elements are located close to the welding zone and a single set of props both support the articles to be welded and provide a negative electrical current contact. A welding head is slidably supported upon a base which is connected to a robot arm by quick release couplings. The base further supports a welding wire reel and brake while the head supports the torch and a welding wire drive device. Props on either side of the welding zone press the article to be welded and provide negative electrical current contact.

3 Claims, 2 Drawing Figures

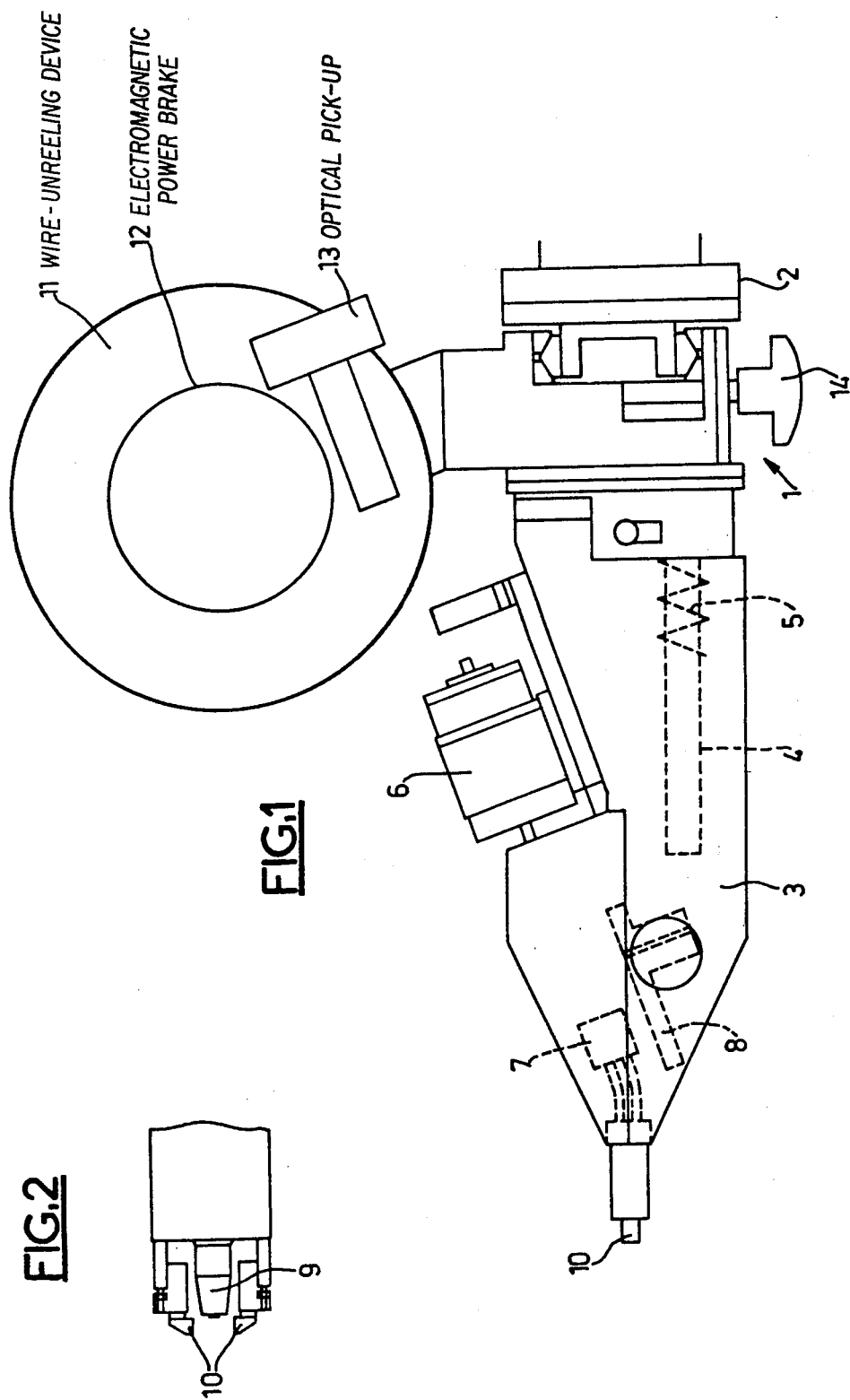

COMPACT TOOL FOR AUTOMATIC MAG SPOT WELDING

BACKGROUND OF THE INVENTION

1. Field of the Invention

The invention has to do with electric arc welding, and especially with automatic pinpoint arc welding using filler metal under gas protection, currently called MAG spot welding.

2. Description of the Prior Art

This type of welding is generally used for assemblages of high resistance parts or parts for which conventional resistance welding cannot be envisaged because of the impossibility of reaching both surfaces of the assemblages at the same time.

This type of welding process essentially brings into operation the filler wire, fed by a reel placed on an unreeling device equipped with a brake and driven by a motor, and the welding torch which guides this wire up to the location of the weld, ensures electrical contact with this wire and distributes the protection gas.

This process presents numerous drawbacks, owing first of all to the fact that the different parts of the installation are spread around and connected by wire conveyor sheaths, which causes haphazard operation as a result of friction and clogging of the sheaths. Furthermore, the return of the welding current (negative pole) is generally accomplished by plugging into a ground external to the torch, often located far from it. Moreover, to insure proper welding, the sheets have to be perfectly laid out alongside each other and held tightly together during the welding, which more often than not is done by means of an external presser bar located some distance from the welding zone and adapted to each particular case. In addition, the reel brake, generally constituted by friction washers, delivers a very variable brake-gear torque per revolution over time, causing haphazard reeling. Since there is generally no end-of-wire pick-up and the welding current is kept on when the reels are empty, a surge in the arc current occurs, systematically deteriorating the contact tube of the torch. Finally, to maintain the position and quality of the weld point, the position of the welding torch must be constant, which is difficult to accomplish by means of the traditional anchorings which cause debris that add to the actual work debris of the torch, with all the above requiring readjustment every time the torch is disassembled.

SUMMARY OF THE INVENTION

The purpose of the invention is to eliminate the foregoing drawbacks by achieving a unified assembly providing all needed services, and usable especially by a robot.

The invention therefore consists of regrouping on the same mobile assembly the wire-unreeling device with its brake, the torch, an alignment means, the current return and an end-of-wire pick-up.

In keeping with one characteristic of the invention, said mobile assembly includes a base, movable by means of the robot or a jack screw, and preferably holding the wire-unreeling device as well as its brake, and a welding head mounted on this base so as to be able to slide axially, with one or several prestressed springs placed between the two. In the neighborhood of the welding point, some support props, preferably two in number, are located on either side of the welding zone, props which will ensure the dual functions of mechanical presser bars and of electric feeding for the return of current, with the effort required for these two functions being furnished by the robot or the jack screw and limited by said prestressed springs. Said props may take various shapes, but act extremely close to the welding zone.

The brake of the wire-unreeling device is constituted by an electromagnetic powder brake fed by a stabilized current feed so as to furnish a constant braking moment. Moreover, an optical pick-up gives information to alert the user or the robot when the reel is almost empty.

Finally, said mobile assembly base is mounted on the motion-imparting device, in particular on the arm of the robot, through an assembly method allowing for rapid mounting and unmounting while ensuring strict repositioning.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 1 is a top view of the welding assembly; and

FIG. 2 is a partial view from above of the tip end of this assembly.

DETAILED DESCRIPTION OF THE PREFERRED EMBODIMENTS

The mobile welding assembly represented in FIG. 1 includes a base 1 fitted with known means so that it can rapidly be fastened to or removed from the tip end 2 of a robot arm or an automatic machine. This base holds the welding head 3 by means of an appropriate axially sliding assemblage, for example a column 4 made unitary with the base 1, and on which the head 3 slides by means of sliding-motion bearings complemented by a guide to prevent rotation (not shown). A prestressed spring 5 is inserted between the base 1 and the head 3 to limit the force applied by the head on the part to be welded.

The welding head 3 includes a wire-drive device 6 of a known type, feeding the torch 7. The torch 7 includes a quick-fastening device onto stand 8 and a guide tube 9 (see FIG. 2).

In keeping with one characteristic of the invention, this welding head 3 also includes two props 10 for support and current return fastened to either side of the guide tube 9. These props have the dual functions of mechanical presser bar, replacing the assorted devices of customary presser bars, and of electric contact to ensure the current return (negative pole).

The mobile assembly also includes the wire-unreeling device 11, whose hub is braked by an electromagnetic powder brake 12 fed by current stabilized by a stabilizer device (not shown) to ensure a constant braking moment. Furthermore, an optical pick-up 13 makes it possible to determine the instant when the reel is almost empty in order to advise the user or the automatic control device. The wire-unreeling device 11 and its accessories (12 and 13) are preferably supported directly by the base 1.

The various units are preferably interchangeable and easily detachable. The wire-drive device 6, constituted in a known manner by a motor with a wire-drive mechanism having orbital rollers, is attached to the head 3 but insulated from it electrically. The torch 7 is mounted on a stand 8, and its position on this stand 8 is preset with the help of an adjustment frame (not shown). The assembly of the torch 7 and its stand 8 is therefore interchangeable with other assemblies which are positionable with the aid of precise guides and centering. In this way, the motor 6 and the torch 7 are always in alignment, and the position of the contact tube 9 remains constant. The two props 10 are likewise interchangeable and preset, and they may take on various shapes depending on needs.

Finally, the exact jointing device involving the base 1 on the tip end 2 of the arm of the robot or the automatic machine includes a prestressed spring which furnishes the tightening strength required by complementary parts, male and female, carried by the base and tip end to ensure strict positioning. A handle 14 makes it possible to tighten this prestressed spring at will in order to withdraw the mobile assembly freely or to free it for purposes of repositioning.

The device according to the invention consequently constitutes a compact and easily transportable unit which may rapidly be adapted to a robot or an automatic machine. The filler wire circuit size is reduced to the minimum and no longer is subject to haphazard occurrences in the guide sheaths. Alignment and current return are carried out as near as possible to the welding zone, which ensures great efficiency and constancy in the result. Besides, because the same props are used for current return and to press the parts to be welded, the spot weld will not be made in the event the welding tool fails to make contact with the part to be welded because of improper positioning of the part or the tool.

Maintenance is facilitated by the rapid unmounting and repositioning of the various interchangeable units, as noted earlier. The quality of the unreeling is improved by the powder brake, and, finally, the robot or the automatic machine is informed before the end of the wire is reached, by the pick-up 13, and can stop at the desired time the electric feeding of the torch or its contact with the part so as to avoid any deterioration of the contact tube 9.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A mobile spot welding assembly for spot welding with filler metal, comprising:
    a welding torch defining a welding zone in which an arc is formed
    two props, one of said props being connected to said torch on either side of said welding zone, said props being adapted to press together articles being welded and to provide a negative electric current contact;
    a filler welding wire unreeling device including a brake;
    a filler welding wire drive device for feeding a wire from said unreeling device to said torch, wherein said wire unreeling device, said brake and said wire drive device are mounted for movement together with said torch and are positioned immediately adjacent said welding zone,
    wherein said mobile assembly includes a base adapted to be fastened to the tip end of an arm of a robot or automatic machine, and a welding head axially slidably mounted on said base without rotation in relation to said base, wherein a prestressed spring or spring assembly is provided between said base and said head to limit the alignment force produced at the level of the props, and wherein said torch is secured to said head and said welding assembly can be fastened to the arm by means of quick action couplings that make presetting and a quick jointing with strict positioning possible with only a minimum amount of tooling required for mounting and unmounting.

2. The assembly according to claim 1 wherein said wire-unreeling device is supported by said base, and wherein said brake is an electromagnetic powder brake fed by a stabilized electric power source.

3. The assembly according to claims 6 or 2 including a torch power supply and automatic control system wherein said wire-unreeling device includes a reel for said wire and an optical pick-up which is adapted to emit a signal whenever the reel is almost empty, wherein said automatic control system interrupts said arc in response to said signal by stopping the power supply to the torch, whereby said reel and residual wire therefrom may be replaced.

* * * * *